United States Patent [19]

Burba, III et al.

[11] Patent Number: 5,154,932
[45] Date of Patent: * Oct. 13, 1992

[54] ANTIMICROBIAL POSITIVELY CHARGED PARTICLES

[75] Inventors: John L. Burba, III, Lake Jackson; John L. Alexander, Richwood; Arthur E. Read, Jr., Lake Jackson; Wilfred W. Wilson, Freeport, all of Tex.

[73] Assignee: The Dow Chemical Company, Midland, Mich.

[*] Notice: The portion of the term of this patent subsequent to May 12, 2004 has been disclaimed.

[21] Appl. No.: 577,825

[22] Filed: Sep. 4, 1990

Related U.S. Application Data

[63] Continuation of Ser. No. 252,281, Sep. 30, 1988, abandoned, which is a continuation-in-part of Ser. No. 60,133, Jun. 9, 1987, Pat. No. 4,990,268, which is a continuation of Ser. No. 752,325, Jul. 5, 1985, abandoned, Continuation-in-part of Ser. No. 47,800, May 7, 1987, Pat. No. 4,790,954, which is a continuation of Ser. No. 752,326, Jul. 5, 1985, Pat. No. 4,664,843.

[51] Int. Cl.$^5$ .................. A01N 59/08; A01N 59/20; A61K 33/08; A61K 33/14
[52] U.S. Cl. .................. 424/605; 424/633; 424/639; 424/641; 424/642; 424/646; 424/648; 424/663; 424/677; 514/574; 514/553
[58] Field of Search .......... 252/315.7, 8.514; 424/690, 692, 605, 633, 639, 642, 646, 641, 648, 663, 677; 514/574, 553

[56] References Cited

U.S. PATENT DOCUMENTS

| | | |
|---|---|---|
| 3,399,136 | 8/1968 | Bell .................. 424/692 X |
| 4,005,191 | 1/1977 | Clark .................. 424/690 X |
| 4,243,555 | 1/1981 | Lee et al. . |
| 4,392,961 | 7/1983 | Lee et al. . |
| 4,392,979 | 7/1983 | Lee et al. . |
| 4,392,980 | 7/1983 | Lee et al. . |
| 4,415,555 | 11/1983 | Anabuki et al. .................. 424/147 |
| 4,430,311 | 7/1983 | Lee et al. . |
| 4,446,201 | 2/1984 | Lee et al. . |
| 4,461,714 | 5/1984 | Lee et al. . |
| 4,477,367 | 7/1987 | Burba, III . |
| 4,511,710 | 4/1985 | Wang et al. . |
| 4,540,509 | 9/1985 | Burba, III . |
| 4,594,335 | 6/1986 | Burba, III et al. . |
| 4,610,797 | 9/1986 | Kar et al. . |
| 4,629,626 | 12/1986 | Miyata et al. .................. 424/147 |
| 4,639,362 | 1/1987 | Schanz .................. 424/692 X |
| 4,664,843 | 5/1987 | Burba, III et al. .................. 252/315.5 |
| 4,727,167 | 2/1988 | Burba, III et al. . |
| 4,790,954 | 12/1988 | Burba, III et al. .................. 252/315.5 |
| 4,822,421 | 4/1989 | Crabb . |
| 4,997,640 | 3/1991 | Bird et al. .................. 424/52 |

Primary Examiner—Robert L. Stoll
Assistant Examiner—Daniel S. Metzmaier

[57] ABSTRACT

Formulations or products are caused to be active antimicrobials by the addition thereto of at least one effective amount of at least one crystalline mixed metal hydroxide (MMOH) conforming substantially to the formula $$Li_mD_dT(OH)_{(m+2d+3+na)}(A^n)_a \cdot xH_2O$$

where m is zero to one, D is a divalent metal, d is from zero to 4, T is a trivalent metal, A represents at least one anion or negative-valence radical, (m+2d+3+na) is equal to or greater than 3, (m+d) is greater than zero, and $xH_2O$ represents excess waters of hydration. The MMOH forms an adduct with, an coats, the microbes, thereby deactivating the microbes.

20 Claims, No Drawings

ANTIMICROBIAL POSITIVELY CHARGED PARTICLES

CROSS-REFERENCE TO RELATED APPLICATIONS

This is a continuation of application Ser. No. 07/252,281 filed Sep. 30, 1988 now abandoned, which is a continuation-in-part of application Ser. No. 060,133 filed Jun. 9, 1987, now U.S. Pat. No. 4,990,268, which is, itself, a continuation application of Ser. No. 752,325 filed Jul. 5, 1985, now abandoned. This application is also a continuation-in-part of application Ser. No. 047,800 filed May 7, 1987, now U.S. Pat. No. 4,790,954, which is, itself, a continuation of Ser. No. 752,326 filed Jul. 5, 1985, now U.S. Pat. No. 4,664,843. Another related application is Ser. No. 166,955, filed Mar. 11, 1988, now U.S. Pat. No. 5,015,409, which has some relationship to Ser. No. 164,156 filed Mar. 4, 1988, now U.S. Pat. No. 4,822,421.

FIELD OF THE INVENTION

The antimicrobial effects of high surface area positively charged particles of crystalline mixed metal hydroxide compounds are disclosed.

BACKGROUND OF THE INVENTION

There is a perceived need for materials which are useful as antimicrobials, yet which are substantially innocuous to animals when applied topically.

It is known that certain hydrated metal compounds, such as $AlOCl \cdot nH_2O$ (pH about 5 or less) or the like, used in underarm deodorant formulations are said to prevent or abate the growth of bacteria.

Preparations and uses of various mixed metal hydroxides including, variously, their derivatives or substituted forms, are disclosed, for example, in U.S. Pat. No. 4,610,797; U.S. Pat. No. 4,594,335; U.S. Pat. No. 4,540,509; U.S. Pat. No. 4,511,710; U.S. Pat. No. 4,477,367; U.S. Pat. No. 4,461,714; U.S. Pat. No. 4,446,201; U.S. Pat. No. 4,430,311; U.S. Pat. No. 4,392,980; U.S. Pat. No. 4,392,979; U.S. Pat. No. 4,392,961; U.S. Pat. No. 4,243,555; and U.S. Pat. No. 4,727,167.

SUMMARY OF THE INVENTION

We have now found that certain mixed metal hydroxides, which are of layered crystalline structures exhibiting cationic surface changes, are beneficial as antimicrobials in formulations which can be applied to, or used with, a wide variety of substances, items, articles, or substrates which may be desirably treated, including topical application to animals, including the human specie. For purposes of conciseness, the expression "MMOH" will be used in this disclosure to refer to the mixed metal hydroxides which are described in detail below. The inorganic MMOH compounds effective in microbial attack are cationic, and, since they are synthetic, can be made substantially of consistent quality and purity.

The crystalline mixed metal hydroxides (MMOH) used in the present invention conform substantially to the empirical formula $$Li_m D_d T(OH)_{(m+2d+3+na)}(A^n)_a \cdot xH_2O$$

where m is an amount of Li of from zero to one,
where D represents at least one divalent metal cation and d is an amount of from about zero to about 4,
where T represents at least one trivalent metal cation,
where A represents at least one monovalent or polyvalent anion or negative-valence radical,
a is an amount of A ions of valence n, with (n.a) being an mount of from about zero to about −3,
where (m+2d+3+na) is equal to or greater than 3,
where m+d is greater than zero, and
where $xH_2O$ represents excess waters of hydration, with x being zero or more. (By "excess waters of hydration" it is meant that there is more water associated with the compound than is needed to supply the amount of hydroxyl ions required in the crystal formula.)

In the above formula, it should be noted that n, being the valence of the anion, is a negative number whereas a is a positive number; thus (n.a) is a negative number.

These crystalline mixed metal hydroxides are found to be beneficial as antimicrobials and can be incorporated into a wide variety of products or other formulations.

In one aspect, the present invention is perceived as being an antimicrobial formulation of the type described having incorporated therein the MMOH compounds.

In another aspect, the present invention is perceived as a means, method, or process for providing antimicrobial activity to the described formulations by incorporating therein at least one of the MMOH compounds.

In yet another aspect, the present invention is perceived as a beneficial use of the antimicrobial MMOH compounds.

In still another aspect, the present invention is perceived as a means for destroying microbes by bringing the MMOH compounds into contact with the microbes.

In yet still another aspect of the present invention, the novel adducts, comprising the MMOH and the microbes destroyed by the MMOH, are useful as a source of organic/inorganic matter for use, e.g., as a fertilizer, mulch, fuel, or nutrient component. Furthermore, the novel adducts, containing the dead microbes, can be safely released into a stream or lake.

As used in this disclosure, "microbes" is used in referring to germs, viruses, bacteria, or any microscopic organisms which have a negatively charged surface. Higher life forms would not be expected to be affected in the same way, by the MMOH, as these small organisms.

DETAILED DESCRIPTIONS INCLUDING BEST MODE

The MMOH compounds useful in the present invention are preferably those of the monodispersed, monolayer variety such as described in copending Ser. No. 060,133 filed Jun. 9, 1987 and in U.S. Pat. No. 4,664,843, but can also be of the varieties disclosed in U.S. Pat. Nos. 4,477,367; 4,446,201; 4,392,979; and U.S. Pat. No. 4,461,714 and the like. For the most part the MMOH compounds are prepared by the general process of forming a solution of compounds of the subject metals under certain conditions whereby a soluble alkaline material, e.g. ammonia, reacts with the soluble metal compounds to produce the layered crystals of mixed metal hydroxides. In formulations in which ammonia is best avoided, other alkalinity can be used, e.g. NaOH or KOH.

The mechanism by which the MMOH compounds deactivate the bacteria, germs, microbes and other pathogenic microorganisms is probably best explained as one in which the tiny, positive charged crystals of MMOH interact with the negative surface charges that are present on the membrane surfaces of the microorganisms, coating it and effectively limiting or preventing the reproduction of the organism by killing it or otherwise inhibiting it. For conciseness we refer to the microorganism coated with MMOH as an "adduct" of the two.

The process of using MMOH compounds to provide antimicrobial products can be achieved in at least two general ways. In one way, the material is dispersed in aqueous or partially aqueous media, a salt is added either predissolved or dry and mixing/or shearing is continued until a smooth, thickened system is obtained. Other ingredients may be blended into the prethickened material. Often, one or more of the ingredients is a salt and a separate activator is not needed.

The other general method involves interaction with other colloidal particles in such a manner that they are linked together through bridges or bonds formed by the MMOH. In these cases, it can be interpreted as forming an adduct with the other particles. This can produce an "extension" effect. This can happen, for instance, when fumed silica or a clay is used as a thickening ingredient and so less material is needed for thickening. This can also occur when a normally soluble material is included in the formulation beyond the point of saturation such that very small or colloidal particles are present and crystals or agglomerates. In this case, thickening can occur when the MAH and other particles are sheared together and agglomerates are broken, exposing fresh faces (surfaces) which react.

The MMOH may be used as a slurry of varied solids content, or dry. The process of manufacturing the MMOH can be varied if starting from $NaAlO_2$ and $Mg^{++}$ salt rather than $Al^{+++}$ and $Mg^{++}$ salts. The alkaline source can be almost any basic substance, while $NH_4OH$ or $NaOH$ is generally preferred. Notwithstanding exceptions noted, the salt used for activation can be almost any ionic substance but components containing operable organic anions or multivalent anions such as $CO_3^{-2}$, $PO_4^{-3}$, $P_3O_{10}^{-5}$ and the like are usually more effective in achieving the thickening, if such thickening is desired. Operability of a given anion is easily pre-determined by practitioners, once they have learned of the present invention.

As used in this disclosure, the expression "thickener" when used in reference to the effect of the MMOH additives, means that the apparent viscosity at ambient conditions and at little or no applied shear has been increased by the addition of the MMOH. The expression "viscosity-modifier" is used herein to refer to the effect obtained by the addition of the MMOH whether or not the effect on viscosity is evident at ambient conditions or at non-ambient conditions and whether or not the effect is a thickening effect apparent under various stress conditions. For example, changing of a Newtonian liquid to a non-Newtonian liquid, or vice-versa, is one form of a viscosity modification. Changing the degree or extent of thixotropicity or dilatancy of a liquid is a form of viscosity modification.

The expression "mixed metal hydroxide" implies that there are at least two different metals in the hydrous oxide crystals. In the present invention, it is preferred that at least one of the metals is a trivalent metal, along with at least one other metal which can be either, or both, of the divalent or monovalent (Li) varieties. The amount of the A anion (or negative-valence radical) is that which substantially satisfies the valence requirements of the cations in the crystalline material.

In the above described formula, the trivalent metal cation is preferably Al, Fe, or Ga, and can be mixtures of any of these. Al is most preferred as the trivalent metal. The Fe compound is more difficult to prepare.

The divalent metal cation is preferably Mg, Ca, Mn, Fe, Co, Ni, Cu, or Zn and can be mixtures of any of these; Ca or Mg, especially Mg, is most preferred as the divalent metal.

The anion, A, can be monovalent, divalent, trivalent, or polyvalent, and is preferably at least one selected form the group consisting of hydroxyl, halide, sulfate, nitrate, phosphate, carbonate, glycolate, lignosulfate, and polycarboxylic or negative-valence radicals. Thus, the A anion can be inorganic or a hydrophilic organic group. Preferably the A anion is inorganic.

The contents of the numerous formulations to which the addition of MMOH compounds can be made varies widely over the pH range of 5.5 to 14, but the effectiveness as an antimicrobial agent becomes diminished as the pH drops off much below about pH 8. Generally, the ingredients and levels of the ingredients which are in a given formulation have more to do with an effect other than that of the antimicrobial activity or any thickening or viscosity-modification that may occur by the addition of MMOH to the formulation. There can, however, be a synergistic effect or cumulative effect between the MMOH and other ingredients present in the formulation in the destruction of, or immobilizing of, microbes which come in contact with the formulation. The versatility of the MMOH compounds is beneficial in that it can be added to so many formulations for antimicrobial activity and/or viscosity purposes without interfering with the other ingredients in their intended purpose.

The amount of MMOH added to a formulation will usually be an amount to provide a concentration in the range of about 0.01% to about 20% or more depending somewhat on the temperature, on the viscosity, on the degree of agitation during its application (affecting the settling rate if the viscosity is quite low), on the product into which it is added, on which of the MMOH varieties is being used, and/or on the extent of antimicrobial activity required. These are matters which can be easily determined by practitioners through routine testing, once they have learned of the present invention. Speaking in a general sense, one would preferably use an MMOH concentration in the range of about 0.1% to about 10%, and, for many applications the range of about 0.5% to about 8% is most preferred. Generally, one would not expect amounts of MMOH of much less than about 50 ppm to give an appreciable amount of antimicrobial activity. At much more than about 20%, one is more likely to encounter solidification or overly thick gelling of a fluid mixture.

The various products, and formulations into which the MMOH compounds are incorporated are, for the most part, those which rely on water or some aqueous base for avoidance of dryness and, in many cases, to provide fluidity to the formulation. It will be understood, of course, that some products, such as skin creams and lotions and medical dressings, also involve hydrocarbons or other organic compounds which may be emulsified in water, or water emulsified in a hydrocarbon (or organic compound), as a part of the formulation.

Among the products contemplated for use with the MMOH compounds of the present invention are, e.g., liquid soaps, bar soaps, shampoos, cleansers, lotions, medical creams, disinfectants, mildewcides, fungicides, and the like. The antimicrobial activity of the MMOH compounds is also beneficial in formulations used in purifying water and other liquids.

The MMOH compounds are beneficially used not only as antimicrobials, but since they can also be used as thickeners or viscosity-modifiers they can serve a double-purpose. In many products they can, variously stabilize emulsions, cause gelling of the formulation to the consistency of gelatin, and/or suspend particles in a fluid formulation. This can be beneficial in many cases where products which are applied to vertical or inclined surfaces can be prevented, or at east retarded, from flowing too rapidly off the surface by the force of gravity. This can be the case when, for example, a disinfectant, mildewcide, fungicide, cleaning solution, or the like is sprayed on the walls of a shower bath stall, or sprayed under the inside edge of a toilet bowl, or on the wall or other vertical or slanted surface. In many cases, the product will run off before it can do a thorough job of treating the surface. The present invention offers a remedy for that problem by providing an antimicrobial which is also a thickener or viscosity-modifier to cause the product to remain in place long enough to do a more thorough job of alleviating the problem for which it was applied. The thickened product can be easily washed off or hosed off with water after it has been allowed to stand for the desired period of time. The thickening effect can normally be "diluted out" using copious amounts of water.

In the following examples the expression "MAH" is in reference to certain compounds within the generic formula shown above and which conform substantially to the formula $$MgAl(OH)_{5-y}Cl_y \cdot xH_2O,$$

where y is from zero to one, and which are prepared by alkalizing (reacting with a compound which provides OH groups, such as NaOH or NH$_4$OH) an aqueous solution containing MgCl$_2$ and AlCl$_3$. The small amount of Cl$^-$ anion is a residual amount of the Cl$^-$ anion which was in the starting materials. When all the Cl$^-$ anion has been replaced by OH anions, the MAH formula becomes essentially MgAl(OH)$_5$ which is an excellent version of the various MMOH compounds which can be used in the present invention so long as it is of the crystalline layered structure.

The following examples are given to illustrate applications of the MMOH in various kinds of products; however, the invention is not limited to only the ones illustrated. In the examples the expression CFU/ml. means Colony Forming Units per milliliter.

EXAMPLE 1

Two solutions are prepared, one of them being 15 liters of aqueous mixture of MgCl$_2$ and AlCl$_3$ (0.219M Mg and 0.231M Al). The other solution being 15 liters of aqueous 1.13M NaOH. The two solutions are brought together in a reaction tee at flow rates sufficient to maintain turbulent flow in the tee and to maintain proper stoichiometry, thus producing an MAH product, where y is about 0.3, which has a pH of about 7.8. The product is filtered and washed with water to remove by-product salts and raise the pH. The product remaining on the filter surface is an aqueous gel which is analyzed and found to be 7.5% MAH having a molar ratio of Mg/Al of 0.82.

An antacid formulation is prepared using 70 parts by weight of the above product into which 30 parts by weight of sorbitol is added. No preservatives are added to the system. The resultant product is inoculated with a series of bacteria and microbe counts are obtained periodically for 28 days, as shown in Table I below.

TABLE I

| Organism | Calculated Initial Count org/mL | 7 Days Org Count (org/mL) | % Red. | 14 Days Org Count (org/mL) | % Red. | 21 Days Org Count (org/mL) | % Red. | 28 Days Org Count (org/mL) | % Red. |
|---|---|---|---|---|---|---|---|---|---|
| S. aurous | $3.500 \times 10^5$ | 0 | >99.9 | 0 | >99.9 | 0 | >99.9 | 0 | >99.9 |
| E. coli | $3.350 \times 10^6$ | 0 | >99.9 | 0 | >99.9 | 0 | >99.9 | 0 | >99.9 |
| Ps. Aeruginosa | $7.775 \times 10^6$ | $5.300 \times 10^2$ | >99.9 | 0 | >99.9 | 0 | >99.9 | 0 | >99.9 |
| C. albicans | $1.248 \times 10^7$ | TNTC | can't calc. | $5.050 \times 10^6$ | 87.56 | $1.438 \times 10^6$ | 88.48 | $1.850 \times 10^3$ | >99.9 |
| A. niger | $3.150 \times 10^5$ | TNTC | can't calc. | $5.050 \times 10^4$ | 83.97 | $5.850 \times 10^4$ | 81.43 | $8.000 \times 10^2$ | 99.75 |
| Ps. cepacia | $7.625 \times 10^5$ | 0 | >99.9 | 0 | >99.9 | $6.500 \times 10^1$ | >99.9 | $1.400 \times 10^2$ | >99.9 |
| Ps. fluorescens | $8.575 \times 10^6$ | $1.898 \times 10^4$ | 99.78 | $1.438 \times 10^4$ | 99.83 | $2.157 \times 10^4$ | 99.75 | $2.500 \times 10^3$ | >99.9 |
| Ps. putida | $2.325 \times 10^5$ | $1.812 \times 10^4$ | 92.21 | $8.100 \times 10^3$ | 96.52 | $1.300 \times 10^2$ | >99.9 | 0 | >99.9 |
| Salmonella sps. | $7.300 \times 10^6$ | $6.950 \times 10^2$ | >99.9 | $5.200 \times 10^3$ | >99.9 | $6.000 \times 10^1$ | >99.9 | 0 | >99.9 |
| B. subtilis | $4.325 \times 10^6$ | $9.490 \times 10^5$ | 78.06 | $3.800 \times 10^5$ | 91.21 | $9.750 \times 10^5$ | 77.46 | $8.800 \times 10^5$ | 79.65 |
| Water pool Isol. | $2.600 \times 10^6$ | $8.340 \times 10^4$ | 96.79 | $1.295 \times 10^4$ | 99.50 | $5.550 \times 10^4$ | 98.87 | $2.700 \times 10^3$ | >99.9 |

EXAMPLE 2

Two solutions are prepared, one of them being 15 liters of aqueous mixture of MgCl$_2$ and AlCl$_3$ (0.572M Mg and 0.245M Al). The other solution being 15 liters of aqueous 1.54M NaOH. The two solutions are brought together in a reaction tee at flow rates sufficient to maintain turbulent flow in the tee and to maintain proper stoichiometry, thus producing an MAH product, where y is about 0.3 which has a pH of about 9.39. The product is filtered and washed with water to remove by-product salts. The product remaining on the filter surface is an aqueous gel which is analyzed and found to be 13.4% MAH having a molar ratio of Mg/Al of 1.68.

An antacid formulation is prepared using the above product in which 30% of the formulation is sorbitol. No preservatives are added to the system. The resultant product is inoculated with a series of bacteria and microbe counts are obtained periodically for 28 days, as shown in Table II below.

TABLE II

| Organism | Calculated Initial org. Count Millions/ml | 7 Days Count Millions/ml | 14 Days Count Millions/ml | 21 Days Count Millions/ml | 28 Days Count Millions/ml |
| --- | --- | --- | --- | --- | --- |
| S. aureus | 9.5 | 0 | 0 | 0 | 0 |
| E. coli | 1.4 | 0 | 0 | 0 | 0 |
| Ps. aeruginosa | 0.77 | 0 | 0 | 0 | 0 |
| C. albicons | 10.8 | TNTC | 0.1 | 1.0 | 0.5 |
| A. niger | 0.13 | TNTC | 0.02 | 0.05 | .03 |
| Ps. cepacia | 0.13 | 0 | 0 | 0 | 0 |
| Ps. fluorescens | 0.85 | 0 | 0 | 0 | 0 |
| Ps. putida | 0.25 | 0 | 0 | 0 | 0 |
| salmonella | 0.59 | 0 | 0 | 0 | 0 |
| B. subtills | 10.0 | 4.9 | 6.2 | 6.4 | 3.2 |

EXAMPLE 3

A 2% MAH (where y is about 0.3) slurry having an alkaline pH was used in this example. A total plate count was performed on the MAH sample to insure a background microbial population of <10 cfu/ml. A USP 28-day antimicrobial preservative efficacy study was then performed on the sample. A 28-day challenge consisted of inoculating the product with one of each of the following challenge inocula to yield $10^6$ CFU/ml. of the product, 1. *Pseudomonas aeruginosa* ATCC #15442
2. *Staphylococcus aureus* ATCC #6538
3. *Escherichia coli* ATCC #11229
4. *Candida albicans* ATCC #10231
5. *Aspergillus niger* ATCC #16404

Prior to product invocation a plate count was performed on each challenge inoculum to determine the population. Each inoculum was then diluted to yield $10^6$ CFU/ml. of product. Pate counts were then performed on the inoculate product at Time-0, Day 7, Day 14, Day 21, and Day 28 to determine the rate of microbial reduction. As can be seen in Table III below, the MAH slurry reduced all bacterial and yeast population to <10 CFU/ml. by Day 14 and regaining at this level throughout the 28-day tete period. In addition, the product reduced the mold population to a satisfaction level during the same time period.

The MAH sample met the USP Preservative Efficacy criteria as stated in the USP Monograph.

EXAMPLE 4

A 1.3% slurry of MAH (y is about 0.3) at a pH of about 8.5 is used in these tests. A sample of the slurry was plated in triplicate on petri dishes and incubated at 30° C. for 72 hours. The results indicate that the same was sterile.

Dilutions of the slurry were prepared in river water to provide concentrations having MAH concentrations of 6,500 ppm, 3250 ppm, 1,000 ppm, 100 ppm, 10 ppm, and 1 ppm. Controls were prepared by adding 1 ml. of sterile water to 9 ml of river water; these controls vary because water taken from the river varies. Echo control was liven the same stirring time, standing time, and incubation time as the test samples. The samples were subjected to various stirring time and standing times bedford being plated on place count agar and incubated for 72 hours at 30° C. A sterile Letheen broth was used as a standard diluent in the plating procedure. The CFU/ml was measured in the standard manner.

The results, shown below in Table IV, indicate that the electiveness of the MAH is largely affected by the ability to keep the MAH from settling in the riveter water which contains a relatively large amount of suspended solids which tend to agglomerate with the MAH and cause the settling and "tie-up" the MAH. This can be offset by providing an amount of MAH in excess of the amount which is sufficient to satisfy the demands of the suspended solids and thereby obtain the benefit of the antimicrobial activity of the MAH. In Table IV below the word "initial" in the stirring column means that no additional stirring was done following the initial stirring done in preparing the solutions.

TABLE III

| Challenge Inoculum Count Prior to Product Inoculation | Adjusted Product Inoculum Count | 0 Time | 7 Days | 14 Days | 21 Days | 28 Days |
| --- | --- | --- | --- | --- | --- | --- |
| Ps. aeruginosa $7.5 \times 10^{10}$ | $7.5 \times 10^7$ | $5.2 \times 10^5$ | <10* | <10 | <10 | <10 |
| S. aureus $6.0 \times 10^{10}$ | $6.0 \times 10^7$ | $3.9 \times 10^4$ | $4.4 \times 10^2$ | <10 | <10 | <10 |
| E. coli $1.3 \times 10^{10}$ | $1.3 \times 10^7$ | $6.2 \times 10^4$ | <10 | <10 | <10 | <10 |
| C. albicans $2.5 \times 10^9$ | $2.5 \times 10^7$ | $1.1 \times 10^5$ | $6.5 \times 10^2$ | <10 | <10 | <10 |
| A. niger $1.6 \times 10^9$ | $1.6 \times 10^7$ | $7.3 \times 10^5$ | $4.0 \times 10^4$ | $2.0 \times 10^4$ | $2.0 \times 10^4$ | $2.0 \times 10^4$ |

*<10 is below the lower limit of detection.

TABLE IV

| Conc. MAH ppm | Stirring (hours) | Standing (hours) | CFU/ml Control | CFU/ml MAH |
|---|---|---|---|---|
| 1000 | initial | 1 | $2 \times 10^5$ | $2 \times 10^5$ |
| 100 | initial | 1 | $2 \times 10^5$ | $2 \times 10^5$ |
| 10 | initial | 1 | $2 \times 10^5$ | $2 \times 10^5$ |
| 1 | initial | 1 | $2 \times 10^5$ | $2 \times 10^5$ |
| 6500 | initial | 0.5 | $6 \times 10^2$ | $9 \times 10^3$ |
| 6500 | 0.5 | none | $1 \times 10^3$ | $2.5 \times 10^4$ |
| 3250 | initial | 0.5 | $1 \times 10^4$ | $1 \times 10^4$ |
| 3250 | 0.5 | none | $4 \times 10^4$ | $4 \times 10^4$ |
| 3250 | 4 | none | $1.6 \times 10^5$ | $2.5 \times 10^5$ |
| 3250 | 16 | none | $1.5 \times 10^6$ | $2.4 \times 10^5$ |

It was nosed during the above tests, by visual observation at various times during the 72 hour incubation period of the plates (but not by actual count), that the bacterial colonies on the plates of the control samples grew faster than the samples with the MAH, even though many of the MAH samples had reached the same bacteria level by the time the 72 hour count was made. These results indicate that the MAH shocks the bacteria and delays its propagation.

EXAMPLE 5

Two samples of a 6500 ppm concentration of MAH in river water were prepared by using an initial mixing and 4 hours standing with one sample, and by using 2 hours of mixing plus 2 hours of standing with the other sample. The samples were plated and incubated for 72 hours at 30° C. The sample that had 2 hours of mixing and 2 hours of standing had no bacterial colonies growing on the plate and was considered to be sterile. The sample that had only initial mixing and 4 hours standing had less than 10 CFU/ml. These results indicate that with a contact time of four hours, 6500 ppm MAH has significant biocidal activity. Although a specific control sample was not tested, the river water itself contained about $2 \times 10^5$ CFU/ml.

EXAMPLE 6

Since it is known that Letheen broth used in making the plates tends to quench the biocidal activity of certain biocides, such as quaternary ammonium compounds, then it was decided to make some tests without using Letheen.

A series of suspensions were made using MAH samples, each one being prepared at the desired concentration in river water, rather than diluted from a suspension of higher concentration. A sample of river water was used as a control. The samples were then stirred for 48 hours and then plated and incubated. Sterile isotonic saline was used as the plating diluent rather than Letheen broth. The results shown below in Table V demonstrate a dramatic reduction in bacteria numbers at all treatment levels compared to the control. It is believed that both concentration and contact time are important variables.

TABLE V

| MAH Concentration | CFU/ml |
|---|---|
| River water control | $3 \times 10^6$ |
| 3500 ppm | $1.4 \times 10^2$ |
| 1750 ppm | $1.4 \times 10^2$ |
| 1000 ppm | $8.6 \times 10^1$ |
| 500 ppm | $1 \times 10^2$ |
| 100 ppm | $3.5 \times 10^2$ |

What is claimed is:

1. A method for providing antimicrobial activity to a formulation or product, effective for deactivating microorganisms which have negative surface charges, said method comprising
   adding to the formulation or product an amount of a positively charged layered crystalline mixed metal hydroxide sufficient to impart antimicrobial activity to the formulation or product, said mixed metal hydroxide being at least one compound conforming substantially to the empirical formula $$Li_m D_d T(OH)_{(m+2d+3+na)}(A^n)_a \cdot xH_2O$$

where m is an amount of Li of from zero to one,
where D represents at least one divalent metal cation and d is an amount of from about zero to about 4,
where T represents at least one trivalent metal cation,
wherein A represents at least one monovalent or polyvalent anion or negative-valence radical or valence n,
a is an amount of A ions of valence n, with na being an amount of from about zero to about $-3$,
where $(m+2d+3+na)$ is equal to or greater than 3,
where $(m+d)$ is greater than zero, and where $xH_2O$ represents excess waters of hydration, with x being zero or more.

2. The method of claim 1 wherein the formulation or product is a cleaning solution.
3. The method of claim 1 wherein the formulation or product is a fungicide.
4. The method of claim 1 wherein the formulation or product is a personal care product.
5. The method of claim 1 wherein the formulation or product is a soap, detergent, or surfactant.
6. The method of claim 1 wherein the formulation or product is a lotion.
7. The method of claim 1 wherein the formulation or product is a salve.
8. The method of claim 1 wherein the formulation or product is an antiseptic.
9. The method of claim 1 wherein the D metal is at least one selected from the group consisting of Mg, Ca, Ba, Sr, Mn, Fe, Co, Ni, Cu, and Zn.
10. The method of claim 1 wherein the D metal is at least one of the group consisting of Ca and Mg.
11. The method of claim 1 wherein the T metal is at least one selected from the group consisting of Al, Fe, and Ga.
12. The method of claim 1 wherein the T metal is Al.
13. The method of claim 1 wherein m is zero, d is one, and na is an amount in the range of zero to negative one.
14. The method of claim 1 wherein A represents at least one inorganic anion or negative-valence radical.
15. The method of claim 1 wherein A represents a hydrophilic organic negative-valence group.
16. The method of claim 1 wherein the mixed meal hydroxide is $MgAl(OH)_{(5+na)}(A^n)_a \cdot xH_2O)$, where n.a is an amount of from zero to negative one, where A is an anion other than $OH^-$ and $xH_2O$ represents excess waters of hydration, with x being zero or more.
17. The method of claim 16 wherein the A anion is a halide.
18. The method of claim 16 wherein the A anion is chloride.
19. A method for providing antimicrobial activity to a formulation or product, effective for deactivating microorganisms which have negative surface charges, said method comprising adding to the formulation or product an amount of a positively charged layer crystalline mixed metal hydroxide sufficient to impart antimicrobial activity to the formulation or product, said mixed metal hydroxide being at least one compound conforming substantially to the empirical formula $$Li_m D_d T(OH)_{(m+2d+3+na)}(A^n)_a \cdot xH_2O$$

where m is an amount of Li of from zero to one,
where D represents at least one divalent metal cation and D is an amount of from about zero to about 4,
where T represents at least one trivalent metal cation,
where A represents at least one monovalent or polyvalent anion or negative-valence radical of valence n,
a is an amount of A ions of valence n, with na being an amount of from about zero to about $-3$,
where (m+2d+3+na) is equal to or greater than 3,
where (m+d) is greater than zero, and where $xH_2O$ represents excess waters of hydration, with x being zero or more, further characterized in that the A anion represents at least one of the group consisting of hydroxyl, halide, nitrate, phosphate, carbonate, glycolate, lignosulfate, and polycarboxylic or negative-valence radicals.

20. A method for providing antimicrobial activity to a formulation or product, effective for deactivating microorganisms which have negative surface charges, said method comprising adding to the formulation or product an amount of a positively charged layered crystalline mixed metal hydroxide sufficient to impart antimicrobial activity to the formulation or product, said mixed metal hydroxide being at least one compound conforming substantially to the empirical formula $$Li_m D_d T(OH)_{(m+2d+3+na)}(A^n)_a \cdot xH_2O$$

where m is an amount of Li of from zero to one,
where D represents at least one divalent metal cation and d is an amount of from about zero to about 4,
where T represents at least one trivalent metal cation,
where A represents at least one monovalent or polyvalent anion or negative-valence radical of valence n,
a is an amount of A ions of valence n, with na being an amount of from about zero to about $-3$,
where (m+2d+3+na) is equal to or greater than 3,
where (m+d) is greater than zero, and where $xH_2O$ represents excess waters of hydration, with x being zero or more, further characterized in that the crystalline mixed metal hydroxide is of the monodispersed, monolayer variety.

* * * * *